July 22, 1969 M. GEBENDINGER 3,456,514
MECHANICAL COUPLING PROVIDING A RIGID CONNECTION
AND A FLEXIBLE CONNECTION
Filed Dec. 19, 1966 2 Sheets-Sheet 1
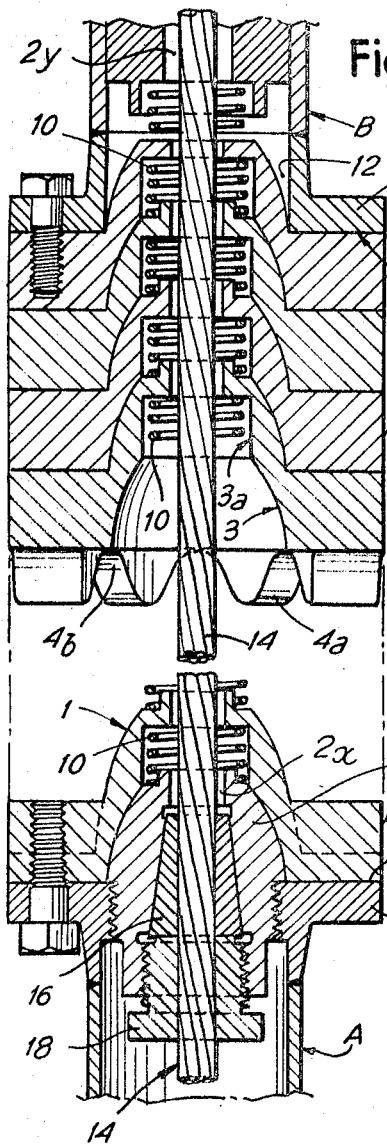
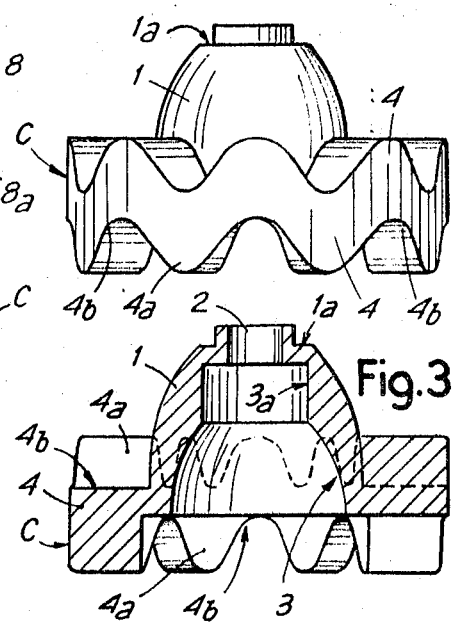
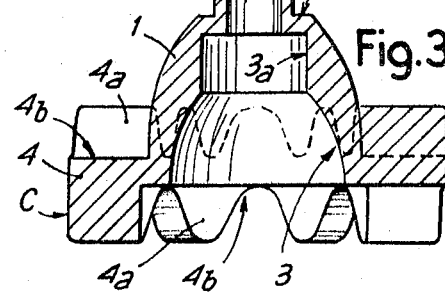
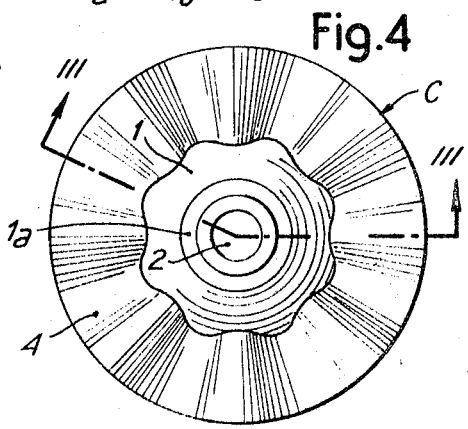
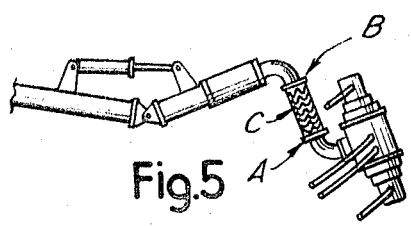
INVENTOR
MARIO GEBENDINGER

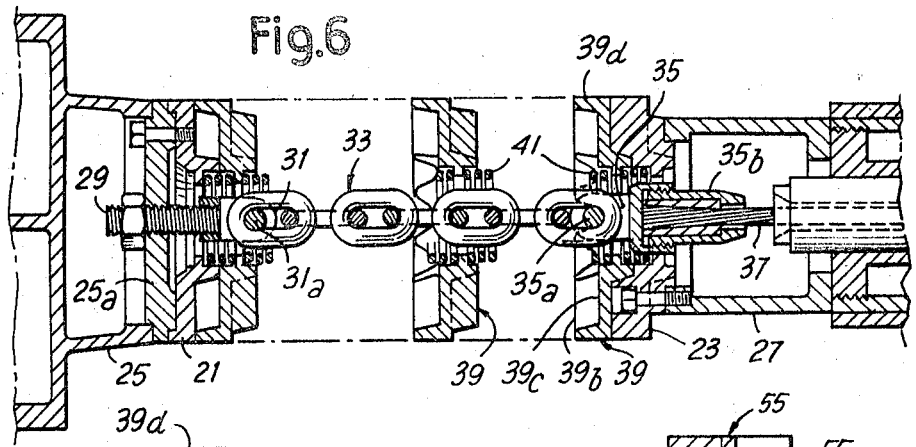
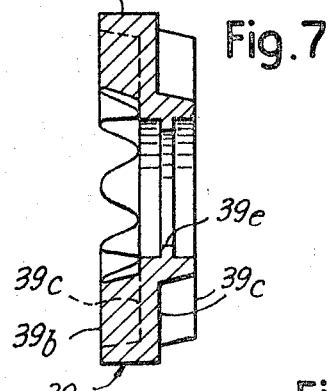
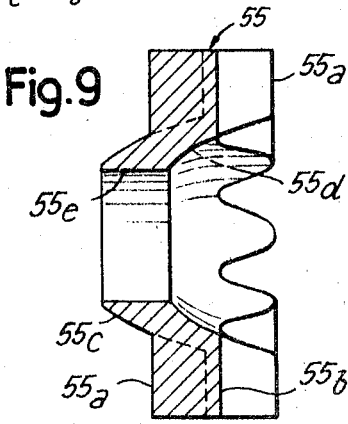
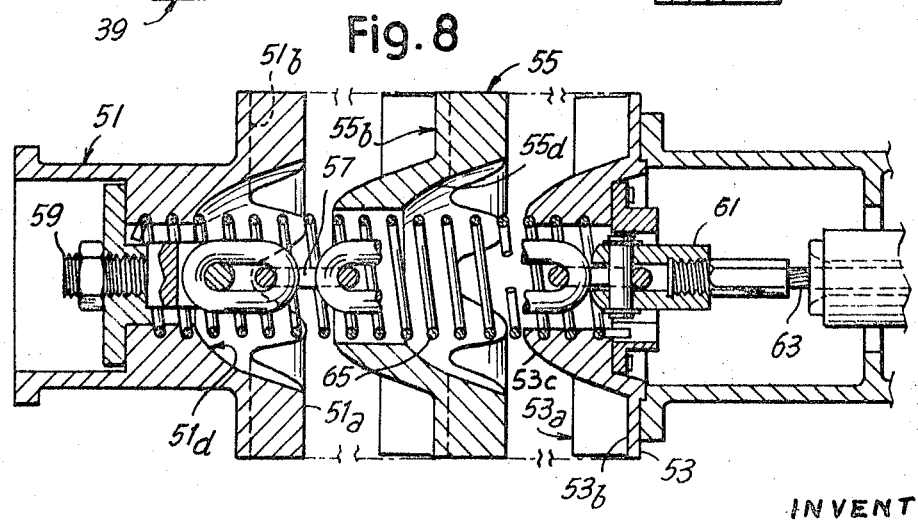

United States Patent Office 3,456,514
Patented July 22, 1969

3,456,514
MECHANICAL COUPLING PROVIDING A RIGID
CONNECTION AND A FLEXIBLE CONNECTION
Mario Gebendinger, Via S. Quirichino,
12/B, Marignolle, Florence, Italy
Filed Dec. 19, 1966, Ser. No. 602,980
Claims priority, application Italy, Dec. 22, 1965,
29,144/65
Int. Cl. F16f 15/00
U.S. Cl. 74—110                                    9 Claims

ABSTRACT OF THE DISCLOSURE

A mechanical coupling provides both a rigid connection and a flexible connection. This coupling includes a pair of end members and a series of annular members interposed between the end members. The inner surfaces of the end members and both surfaces of the intermediate annular members are formed with complementary coupling surfaces interengageable when the end members are pressed toward each other to compress the annular members into coupling engagement with each other and with the end members.

---

The annular members and the end members are designed to be centered with each other by suitable means such as, for example, individual springs interposed between adjacent annular members or a single spring extending through the annular members and engaged with the two end members. A flexible tie rod extends axially of the annular members between the two end members to clamp the end members and the annular members into coupling engagement to stiffen the coupling to provide a rigid connection. When the members are allowed to move away from each other, a flexible connection is obtained which is characterized by the avoidance of the transmission of vibration.

Background of the invention

This invention is directed to mechanical couplings and, more particularly, to a novel mechanical coupling providing both a rigid connection and a flexible connection between a pair of end members, and characterized by avoidance of the transmission of vibrations when the coupling is flexible.

Such a coupling may be used, for example, for supporting a vibrator to be applied to a branch of a tree. In this particular application, which is by no means limiting, the coupling interrupts the transmission of vibrations during shaking of the tree, while allowing handling of the vibrator for its application to the tree.

An object of the invention is to provide a mechanical coupling which may be used either as a rigid coupling or a flexible coupling and which is characterized by the avoidance of the transmission of vibrations when the coupling is used as a flexible coupling.

Another object of the invention is to provide such a mechanical coupling which comprises a pair of end members and a series of interposed or intermediate annular members, the annular members and the end members having facing complementary surfaces interengaged when the end members are pulled toward each other to clamp the annular members therebetween, thereby to provide a rigid coupling.

A further object of the invention is to provide a mechanical coupling of the type just mentioned including means biasing the annular members and the end members to separate each other to a predetermined extent, and means restraining the members against such separation.

Yet another object of the invention is to provide such a mechanical coupling including a flexible tie rod extending axially of the assembly of the end members and the intermediate members to clamp the annular members into coupled engagement with each other and with the end members against the action of opposing means tending to separate the end members.

A further object of the invention is to provide a mechanical coupling of the type just mentioned in which the flexible tie rod is a flexible cable.

Still another object of the invention is to provide a mechanical coupling of the type mentioned and in which the flexible tie rod comprises, at least in part, a multi-link chain.

Summary of the invention

In accordance with the foregoing objects, the invention mechanical coupling includes a pair of end members having radial flanges, with the facing surfaces of these flanges being formed with suitable coupling formations such as, for example, substantially sinusoidal teeth extending annularly of the flanges. The intermediate annular members also include radial flanges which are formed, on one side, with undulating teeth corresponding to the undulating teeth on the flanges of the end members and, on the opposite surface, with undulating depressions having mating conforming engagement with the undulating teeth, the annular members being substantially identical in construction.

Furthermore, each annular member is formed with a suitably shaped centering hub portion which has a conforming and centering fit in a mating centering recess in the adjacent annular member, one of the two end members having such a centering hub portion and the other end member having such a centering recess.

Preferably, the amount by which the annular members may separate from each other does not exceed the depth of the undulating recesses or the height of the undulating teeth, so that angular registry is maintained between the annular members and between the annular members and the end members even during partial separation of the parts.

In one embodiment of the invention, individual compression springs are interposed between adjacent annular members, and between the annular and end members, and tend to center adjacent members. In another embodiment of the invention, a single compression spring extends through all of the intermediate annular members and is engaged between the two end members. The centering hub may have a convex surface, such as a partially arcuate and partially spherical surface, and the centering recess may have a conforming concave partially arcuate and partially spherical surface. Alternatively, the centering hub may have a frusto-conical surface and the centering recess may also have a frusto-conical surface.

Brief description of the invention

For an understanding of the principles of the invention, reference is made to the following description of typical embodiments thereof as illustrated in the accompanying drawings.

In the drawings:

FIG. 1 is an axial sectional view of one form of mechanical coupling embodying the invention;

FIG. 2 is an elevation view of one of the intermediate annular members shown in FIG. 1;

FIG. 3 is a diametric sectional view taken on the line III—III of FIG. 4;

FIG. 4 is a plan view of one of the intermediate annular members;

FIG. 5 is a side elevation view illustrating a possible use of the mechanical coupling of the invention;

FIG. 6 is an axial sectional view through another form of mechanical coupling embodying the invention;

FIG. 7 is a diametric sectional view of one of the intermediate annular members of FIG. 6;

FIG. 8 is an axial sectional view through a further form of mechanical coupling embodying the invention;

FIG. 9 is a diametric sectional view of one of the intermediate annular members of FIG. 8.

Description of the preferred embodiments

Referring first to FIGS. 1 through 4, a pair of end members A and B are designed to be rigidly interconnected by means of a coupling embodying the invention, but the end members may be relatively uncoupled from each other in such a manner that the vibration of one member is not transmitted to the other end member. Several annular contoured members C are interposed between the end members A and B, and these annular intermediate members are designed to provide a rigid connection while allowing a mutual separation in order to avoid transmission of vibrations.

As best seen in FIGS. 2, 3 and 4, each intermediate annular member C includes a centering hub or core portion 1 having a central or axial opening 2 therethrough, and further includes a relatively large cavity 3 whose inner concave surface corresponds to, or is complementary to, the convex outer surface of centering hub 1. A flange 4 extends radially from hub 1 and its opposite surfaces are provided with two complementary profiles of a substantially undulating nature. These profiles form teeth 4a, of sinusoidal profile, on the front surface of the flange, and recesses 4b, also of sinusoidal profile, on the rear surface of the flange. The apex of a tooth on one surface of the flange corresponds to the base of the recess on the other surface of the flange.

Referring to FIG. 1, each end member A and B is formed with a radially extending portion or flange 7 and 8, respectively. These flanges have forward or inner facing surfaces 7a and 7b, respectively, and these facing inner surfaces of flanges 7a and 8a are shaped or contoured in the same manner as the surfaces of flanges 4. Thus, surfaces 7a and 8a are formed with undulating profiles, such as undulating teeth or undulating recesses, which are complementary to the corresponding profiles of the intermediate annular members C. The several intermediate annular members C are interposed, in the nature of a pile, between end members A and B and particularly between inner surfaces 7a and 8a. The intermediate annular members are assembled by inserting the convex core or centering hub 1 of one annular member into the concave centering recess 3 of the adjacent annular member, and with the undulated profile of one member having mating interengagement with the complementary undulated profile of an adjacent intermediate member. The outer annular members of the pile cooperate with the surfaces 7a and 8a respectively.

In correspondence with the cylindrical extensions 3a of cavities 3 of annular members C, springs 10 are inserted between adjacent annular members C and react between the bottom surface of the extension 3a of a cavity 3 and a seat 1a provided at the outer end of centering hub 1 of an adjacent annular member C. This assures a possibility of relative separation of the members between which springs 10 are engaged, without the springs taking part in the transmission of a vibration.

End member A is formed with a centering hub or core member 11 which projects from flange 7 and is engageable in the cavity 3 of the first annular member C adjacent thereto. Correspondingly, centering hub 1 of the last of the annular members C, adjacent end member B, engages a concave recess or passage 12 in end member B.

The assembly of annular members C and end members A and B has extending therethrough a tie rod means in the form of a flexible cable 14. This cable extends through openings 2 in annular members C, and corresponding axial passage 2x, in part 11, and 2y, in end member B. Flexible cable 14 is anchored to end member A by wedge means 16 tightened by a screw member 18 threaded into core or hub 11. At the opposite end of the assembly, which is not visible in FIG. 1, cable 14 can be connected to a tension jack reacting on end member B.

When flexible cable 14 is placed under tension, it compresses springs 10 and assures coupling of the complementary undulated surfaces of the flanges 4 of adjacent intermediate annular member C, as well as assuring complementary interengagement between the pile of annular members C and the surfaces 7a and 8a of end members A and B, respectively. Thereby, there is assured a complete rigidity between end members A and B of the coupling. By loosening flexible cable 14, springs 10 can bias the adjacent annular intermediate members C apart while maintaining centering thereof, to assure a separation between the contact surfaces of the annular members C and between these annular members C and the end members A and B. Consequently, there is not transmission between end members A and B, as there is no rigid coupling interconnecting these end members. Springs 10 assure a relative spacing of the elements which, in cooperation with the nature of flexible tie rod 14, is such as not to effect any transmission of vibrations or shaking.

The separation between the contact surfaces of the members A, B and C can be adjusted in such a manner that the projections 4a, and the corresponding projections of flanges 7 and 8, do not disengage the complementary surface by an amount in excess of the depth of the recesses 4b. Thus, each time cable 14 is re-tensioned, the coupling of the several members is positively obtained in the same mutual angular relation. Consequently, end members A and B are always rigidly coupled together in a constant relative angular position, when cable 14 is re-tensioned. Such limitation of the relative disengagement, and of the relative angular displacement of the coupling surfaces, is provided both by the limits of loosening of flexible cable 14 and by the depth of the recesses of the undulations, as well as by the twisting which is generally always assumed by the cable in its loosened position, so that at least some teeth always remain at least partially intermeshed with each other.

Referring to FIGS. 6 and 7, the coupling member illustrated intercouples an end member 21 and an end member 23. Two drive portions 25 and 27 are provided, and one portion 25 is rigidly connected to end member 21 with the other portion 27 being rigidly connected to the end member 23. Alternatively, end member 21 may be made integral with end portion 25 and end member 23 may be made integral with portion 27. End member 23 and portion 27 have a flexible tie rod extending therethrough, and this tie rod is anchored to a disk-shaped shim 25a of portion 25.

The anchoring member includes a thread stem 29 having a forked portion 31 across which extends a transverse pivot 31a. The first link of a chain 33 is engaged with pivot 31a, and chain 33 extends through the annular intermediate members 39 disposed between end members 21 and 23. The last link of chain 33 is anchored to a pin 35a extending transversely of fork 35 forming part of an anchoring clamp 35 for a flexible cable 37. Chain 33, and the flexible cable 37 connected to this chain, form the flexible tie rod having a function similar to that of the cable 14 of FIGS. 1 through 4.

As best seen in FIG. 7, each intermediate annular member 39 has a radial flange undulated on both surfaces. These undulations include peaks 39b and recesses 39c between the peaks. Furthermore, each annular intermediate member 39 is formed with a centering rim 39d having a frusto-conical radially inner surface or wall which cooperates with the frusto-conical radially outer surface or wall of a hub extending from the opposite surface of an adjacent annular member. These interengageable frusto-conical surfaces correspond to the convex surfaces of centering hubs 1 and the concave surfaces of recesses 3 of FIGS. 1 through 4. However, the mating or complementary centering surface of intermediate members 39 can be surfaces of spherical segments, for a better adjustment.

Intermediate annular members 39 also cooperate with springs 41 which react between annular ledges 39e in the central opening through the annular members, for purposes similar to those of the springs 10 of FIGS. 1 through 4. Those annular intermediate members at the ends of the row or pile thereof cooperate with complementary surfaces of end members 21 and 23. Chain 33, which partially replaces the cable of FIGS. 1 through 4, prevents the cable being overstressed, which might damage it, particularly with the imposition of compression or bending stresses on the cable.

In the embodiment of the invention shown in FIGS. 8 and 9, the end members are indicated at 51 and 53 and have intermediate annular members 55 interposed therebetween. A chain 57 extends completely through all of the intermediate members and through the two end members and is anchored by a threaded fork member 59 to end members 51. The opposite end of chain 57 is anchored to a forked and threaded connection member 61 which serves as an anchor for a cable 63 or other tye of tie.

The annular intermediate members 55 again have radial flanges which have undulations on their opposite surfaces, these undulations including peaks 55a and recesses 55b between the peaks. Furthermore, annular members 55 have, on one side, centering projections or hubs 55c having convex, such as partially arcuate and partially spherical, surfaces. On the opposite sides of each annular member, there is formed a concave recess 55d adapted to have a complementary or mating fit with the projection 55c of an adjacent annular member. An opening 55e extends centrally of each annular member 55. Correspondingly, end member 51 is formed with a concave recess 51d to have a mating or complementary fit with the centering hub 55c of the adjacent annular member 55, while end member 55 has a convex centering hub 53c similar to the centering hub 55c of the intermediate annular members 55.

End members 51 and 53 have radial flanges whose inner surfaces are formed with undulations mating or complementary with the similar surfaces on the flanges of the intermediate members 55. Thus, the undulating surfaces of end members 51 and 53 have peaks 51a, 53a and recesses 51b and 53b, similar to the peaks 55a and recesses 55b of the intermediate members, whereby the undulating surfaces may mate and complement each other.

Annular members 55 are formed in a pile around a single helical spring 65 surrounding chain 57 and having its ends seated on end members 51 and 53. In this embodiment of the invention coupling, the single spring tends to move the end members 51 and 53 apart while maintaining centering thereof, while separation of the intermediate members occurs automatically when the device begins to vibrate. Thereby, the individual springs 10 of FIGS. 1 through 4 are eliminated. However, it should be understood that a single spring could be provided in the embodiment of FIGS. 6 and 7 or in the embodiment of FIGS. 1 through 4.

As an advantageous embodiment of the invention, the annular intermediate members may be made of different materials and mounted in alternation. Thus, for example, the pile of intermediate members may include, in alternation, members of soft vinyl polychloride and members of polystyrene or of a light alloy.

What is claimed is:

1. A mechanical coupling selectively providing a rigid connection or a flexible connection, with avoidance of transmission of vibrations when providing a flexible connection, said coupling comprising, in combination, a pair of spaced end members having their facing surfaces shaped as coupling surfaces; plural annular intermediate members interposed between said end members and each having opposite surfaces shaped as torque transmitting coupling surfaces for coupling of said intermediate members to each other and to said end members to maintain constant angular registry of said end and intermediate members, said intermediate members being arranged for mutual separation; biasing means extending axially within said members and centering said end members and said intermediate members on each other; and a flexible tie rod means extending centrally through said end and intermediate members and operatively connected to said end members; said tie rod means, when tensioned, forcing the end members toward each other, against the bias of said biasing means, to clamp the intermediate members therebetween to make rigid the connection of said end members.

2. A mechanical coupling, as claimed in claim 1, in which the coupling surfaces of said end and intermediate members are formed with radial teeth having an undulated profile.

3. A mechanical coupling, as claimed in claim 2, in which the height of said teeth is in excess of maximum separation of two adjacent members.

4. A mechanical coupling, as claimed in claim 1, in which said biasing means comprises individual springs each interposed between a pair of adjacent members and biasing the adjacent members to separate from each other.

5. A mechanical coupling, as claimed in claim 1, in which said biasing means comprises a compression spring having its respective opposite ends engaged with said two end members, said annular intermediate members embracing said spring.

6. A mechanical coupling, as claimed in claim 1, in which each annular member has a centering hub projecting from one surface and having a hub surface which is at least patrially spherically-shaped; each annular member having, extending inwardly from its opposite surface, a concave recess which is complementary to the centering hub and whose concave surface mates with the hub surface of the centering hub; one of said end members being formed with one of said centering hubs and the other of said end member being formed with one of said concave recesses.

7. A mechanical coupling, as claimed in claim 1, in which each of said intermediate members has, extending from one surface, a rim having a frusto-conical radially inner surface and, extending from the opposite surface, a second rim having a frusto-conical radially outer surface, the radially outer rim surface of one annular member having a complementary mating engagement in the radially inner rim surface of an adjacent annular member; one of said end members being formed with a radially inner frusto-conical surface conformingly receiving a radially outer frusto-conical surface on the adjacent annular intermediate member and the other end member being formed with a radially outer frusto-conical surface conformingly engaging in the radially inner frusto-conical surface of the adjacent annular intermediate member.

8. A mechanical coupling, as claimed in claim 1, in which said flexible tie rod comprises, at least in the portion extending through said annular intermediate members, a multi-link chain.

9. A mechanical coupling, as claimed in claim 1, in which said flexible tie rod comprises a flexible cable.

References Cited

UNITED STATES PATENTS 2,474,690  6/1949  Robinson et al. _____ 287—86
3,266,059  8/1966  Stelle _____ 287—86 XR FRED C. MATTERN, Jr., Primary Examiner
F. D. SHOEMAKER, Assistant Examiner U.S. Cl. X.R.

287—86